United States Patent
Seite et al.

(10) Patent No.: US 10,379,207 B2
(45) Date of Patent: Aug. 13, 2019

(54) COMPACT OMNIDIRECTIONAL ANTENNA FOR DIPPING SONAR

(71) Applicant: THALES, Courbevoie (FR)

(72) Inventors: François Seite, Brest (FR); Didier Billon, Brest (FR); Eric Sernit, Saint Laurent du Var (FR); Raphaël Lardat, Roquefort-les-Pins (FR); Yves Lagier, Sophia Antipolis (FR); Daniel Andreis, Mandelieu la Napoulie (FR)

(73) Assignee: THALES, Courbevoie (FR)

( * ) Notice: Subject to any disclaimer, the term of this patent is extended or adjusted under 35 U.S.C. 154(b) by 405 days.

(21) Appl. No.: 15/106,169

(22) PCT Filed: Dec. 22, 2014

(86) PCT No.: PCT/EP2014/079002
§ 371 (c)(1),
(2) Date: Jun. 17, 2016

(87) PCT Pub. No.: WO2015/092066
PCT Pub. Date: Jun. 25, 2015

(65) Prior Publication Data
US 2016/0327640 A1    Nov. 10, 2016

(30) Foreign Application Priority Data
Dec. 20, 2013    (FR) .................................... 13 03023

(51) Int. Cl.
*G01S 7/00* (2006.01)
*G01S 7/521* (2006.01)
(Continued)

(52) U.S. Cl.
CPC .............. *G01S 7/521* (2013.01); *G01S 7/003* (2013.01); *G01S 15/88* (2013.01); *G10K 11/008* (2013.01)

(58) Field of Classification Search
USPC .......................................................... 367/141
See application file for complete search history.

(56) References Cited

U.S. PATENT DOCUMENTS

| 4,068,209 A | * | 1/1978 | Lagier | ................... B06B 1/0618 |
| | | | | 367/158 |
| 4,279,025 A | * | 7/1981 | Suppa | ................... B63B 22/003 |
| | | | | 244/138 R |

(Continued)

FOREIGN PATENT DOCUMENTS

| FR | 2 604 530 A1 | 4/1988 |
| FR | 2 776 161 A1 | 9/1999 |
| GB | 2 093 996 A | 9/1982 |

OTHER PUBLICATIONS

Jian Li et al., "On Robust Capon Beamforming and Diagonal Loading," IEEE Transactions on Signal Processing, vol. 51, No. 7, Jul. 2003, pp. 1702-1715.

*Primary Examiner* — James R Hulka
(74) *Attorney, Agent, or Firm* — Baker & Hostetler LLP

(57) ABSTRACT

A compact omnidirectional antenna for dipping sonar comprises multiple elementary transmission rings formed around a longitudinal axis of the antenna and multiple hydrophones distributed around the longitudinal axis, the antenna intended to be dipped in water, the hydrophones separate from the elementary transmission rings, the hydrophones and the elementary transmission rings fixed in the antenna. The elementary transmission rings and the hydrophones are interlinked along one and the same height (H) measured along the longitudinal axis.

12 Claims, 5 Drawing Sheets

(51) Int. Cl.
   *G10K 11/00* (2006.01)
   *G01S 15/88* (2006.01)

(56) References Cited

U.S. PATENT DOCUMENTS

| | | | | |
|---|---|---|---|---|
| 4,295,211 A * | 10/1981 | Suppa | ................... | G10K 11/006 367/4 |
| 4,305,141 A | 12/1981 | Massa | | |
| 4,380,440 A * | 4/1983 | Suppa | ................... | B63B 22/22 244/138 R |
| 4,641,290 A * | 2/1987 | Massa | ................... | G10K 11/006 367/106 |
| 5,319,612 A * | 6/1994 | Lemer | ................... | G10K 11/008 367/124 |
| 5,515,342 A * | 5/1996 | Stearns | ................ | B06B 1/0618 310/334 |
| 5,729,507 A * | 3/1998 | Massa | ................... | G01S 3/803 367/124 |
| 5,795,203 A * | 8/1998 | Suppa | ................... | B63B 22/22 441/1 |
| 6,046,962 A * | 4/2000 | Suppa | ................... | B06B 1/045 367/172 |
| 6,065,349 A * | 5/2000 | Edouard | ............... | B06B 1/0655 73/861.18 |
| 6,515,940 B2 * | 2/2003 | Suppa | ................... | B06B 1/045 367/172 |
| 6,617,765 B1 * | 9/2003 | Lagier | ................... | G10K 9/122 310/322 |
| 6,671,228 B1 * | 12/2003 | Griffin | ................ | G10K 11/008 367/104 |
| 6,856,580 B2 * | 2/2005 | Eyries | ................ | G10K 11/008 367/155 |
| 8,400,878 B2 * | 3/2013 | Lindner | ................ | G10K 11/006 367/151 |
| 2004/0052160 A1 | 3/2004 | Eyries | | |

* cited by examiner

COMPACT OMNIDIRECTIONAL ANTENNA FOR DIPPING SONAR

CROSS-REFERENCE TO RELATED APPLICATIONS

This application is a National Stage of International patent application PCT/EP2014/079002, filed on Dec. 22, 2014, which claims priority to foreign French patent application No. FR 1303023, filed on Dec. 20, 2013, the disclosures of which are incorporated by reference in their entirety.

FIELD OF THE INVENTION

The present invention relates to the general field of sonar detection, in particular implemented in anti-submarine warfare. It more particularly relates to the field of airborne sonars, referred to as "dipping sonars", implemented from a helicopter.

BACKGROUND

In the context of anti-submarine warfare activities, in order to be able to detect submerged submarines in a given area, sonars are generally employed, in particular active sonars. In this context, the deployment of sonars from airborne platforms, airplanes or helicopters, has been proven to be especially effective, as such platforms have high mobility with respect to submarines.

Thus, maritime patrol airplanes deploy sonobuoys that are composed of acoustic sensors, and sometimes transmitters, and a VHF system acting as a relay for communication to the aircraft.

In an analogous manner, helicopters may also be used to implement sonar transmitters and receivers that are linked, by a cable, to their platform, i.e. to the helicopter. These are then referred to as "dipping sonars". The submerged cable-linked sub-assembly is henceforth referred to as an antenna. It comprises the sonar transmitters and receivers per se, and potentially electronic equipment associated with the transmitters and receivers. It may also comprise environmental sensors.

The dipping of these antennas into the water from the platform, the control thereof once immersed and their recovery are carried out by means of a winch located inside the helicopter. In addition to antenna deployment and recovery functions, the winch cable generally conveys the sonar signals as well as the electrical power that is required for acoustic transmission and operation of the receivers. Moreover, equipment required for generating acoustic signals and processing received acoustic data is located on board the helicopter.

The increased acoustic stealth of modern submarines has necessitated an evolution of the detection techniques employed toward high-power sonars operating at low frequency. This evolution translates into an increase in the dimensions and mass of the various sub-assemblies forming the sonar. For example, for the antenna, the fact of lowering its operating frequency has tended to increase its dimensions. Antennas have, for example, been developed in which the sound wave receivers, or hydrophones, are arranged on arms that are deployed during operation. Between sonar operating phases, the arms are folded back and the antenna, wound back in by the winch to a position referred as the storage position, is stowed inside the helicopter. It is sometimes difficult to house all of the sub-assemblies of a sonar inside a helicopter. The antenna, which is generally cylindrical in order to be omnidirectional in terms of bearing and directive in terms of elevation, is suspended by the cable that bears it. The greatest vertical dimension of the sonar is restricted by the height of the antenna at which the cable attachment at the top of the antenna must be added and, at least in part, by a winch pulley whose diameter depends on the minimum radius of curvature to which the cable may be subjected. This dimension must be able to fit, in terms of height, in the helicopter.

Regarding the increase in the mass of sonar sub-assemblies, this affects the duration of missions that a carrier is able to carry out with its sonar.

SUMMARY OF THE INVENTION

The invention aims to reduce the bulk and mass of certain sub-assemblies of a dipping sonar, in particular the mass and height of the antenna, while retaining analogous acoustic performance. The invention also aims to reduce the complexity of certain sub-assemblies, in particular of the antenna. More specifically, the invention allows the articulated arms bearing the hydrophones to be omitted. By avoiding such moving parts, the reliability of the sonar is improved.

To this end, a subject of the invention is an omnidirectional antenna intended to be equipped by a dipping sonar, the antenna comprising multiple elementary transmission rings that are formed around a longitudinal axis of the antenna and multiple hydrophones that are distributed around the longitudinal axis, the antenna being intended to be dipped in water, the hydrophones being separate from the elementary transmission rings, the hydrophones and the elementary transmission rings being fixed in the antenna, characterized in that the elementary transmission rings and the hydrophone rings are interlinked along one and the same height measured along the longitudinal axis, in that the elementary transmission rings and the hydrophones operate at a working frequency of less than 8 kHz, in that a first minimum cylindrical volume around the longitudinal axis occupied by the elementary transmission rings and a second minimum cylindrical volume around the longitudinal axis occupied by the hydrophones have a diameter ratio of less than 30%, and in that the diameter ratio of the two volumes is constant regardless of whether the antenna is in operation or in a storage position.

The range of a sonar antenna is linked to the working frequency of the hydrophones. An antenna according to the invention may operate at a working frequency of less than 8 kHz. Stated otherwise, the elementary transmission rings and the hydrophones operate at a working frequency of less than 8 kHz. Advantageously, it is possible to go down to frequencies of less than 6 kHz, or even less than 4 kHz.

There exist acoustic components, commonly referred to by the term Tonpilz, that allow both the transmission and reception of sound waves to be carried out. For frequencies of less than 8 kHz, this type of component would be much too bulky and the antenna would be unsuited to a dipping sonar, in particular one on board a helicopter. For working at low frequency, it is advantageous to separate the transmission rings from the hydrophones.

In the prior art of low-frequency dipping sonar antennas, in particular in cylindrical antennas, the transmission rings occupy a volume that is separate from that of the hydrophones. The term "volume" is understood to mean a space with a convex contour. In contrast, according to the invention the elementary transmission rings and the hydrophones are interlinked, i.e. the volumes occupied by the transmission rings and the volume occupied by the hydrophones have shared portions. The distribution of the hydrophones and the transmission rings may or may not be regular. The fact of interlinking the elementary transmission rings and the hydrophone rings allows the acoustic transmitters and receivers each to be distributed over a greater volume.

More specifically, a first minimum cylindrical volume occupied by the elementary transmission rings and a second minimum cylindrical volume occupied by the hydrophones are defined. These two volumes are the smallest possible cylinders that include the transmission rings or the hydrophones.

Advantageously, the projections from the phase centers of the hydrophones in a horizontal plane that is perpendicular to the longitudinal axis, or in a vertical plane containing the longitudinal axis, are spaced apart by less than $\lambda/3$, $\lambda$ being the wavelength at the working frequency. Reducing the distance between hydrophones in a horizontal plane allows the directivity of the antenna in terms of bearing to be improved and between hydrophones in a vertical plane the directivity of the antenna in terms of elevation to be improved. Depending on the mission for which the antenna is intended, it may be chosen to favor one directivity or the other. It is of course possible to reduce the distance between hydrophones in both planes.

Another subject of the invention is a sonar comprising an antenna according to the invention. Advantageously, the sonar comprises a computer configured to carry out sonar beamforming, beamforming parameters being calculated on the basis of the covariance of a spatially correlated noise according to an adaptive processing formalism that is robust with respect to antenna calibration errors.

Of course, the invention is not limited to a sonar equipped by a helicopter. The carrier equipped with a dipping sonar according to the invention may be of any nature. By reducing the mass of a dipping sonar, it is, for example, possible for a drone to be equipped with a sonar according to the invention.

BRIEF DESCRIPTION OF THE DRAWINGS

The invention will be better understood and further advantages will become apparent upon reading the detailed description of one embodiment given by way of example, which description is illustrated by the attached drawing in which.

For the sake of clarity, the same elements will bear the same references in the various figures.

DETAILED DESCRIPTION

Figure 1:
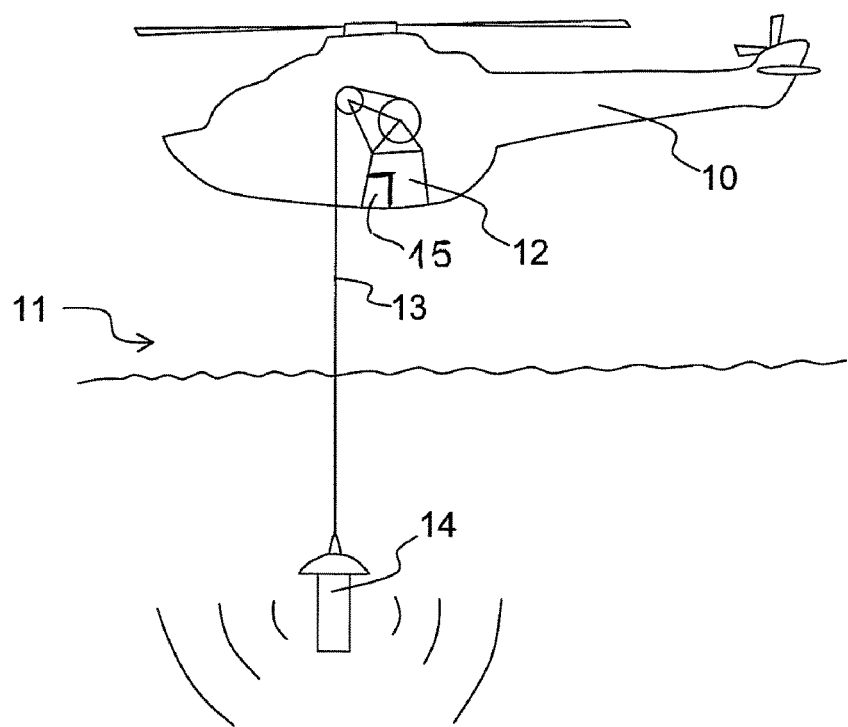
FIG. 1 shows a helicopter equipped with a dipping sonar.

FIG. 1 shows a helicopter 10 hovering above the water. The helicopter 10 is equipped with an active dipping sonar 11. This type of sonar allows submarine objects to be detected and classified, in particular.

The sonar 11 essentially comprises a winch 12 installed on board the helicopter 10, a cable 13 and an omnidirectional antenna 14, shown submerged in FIG. 1. The antenna 14 is suspended from the cable 13 and the winch 12 allows the cable 13 to be wound in and wound out depending on the depth to which it is desired to submerge the antenna 14. The winch also allows the antenna 14 to be wound back inside the helicopter 10. The sonar 11 also comprises electronic equipment (not shown) on board the helicopter 10. The equipment allows the sonar to be operated, in particular for generating sound waves and for making use of the waves received as echoes of the transmitted waves. The equipment also allows the antenna 14 to be supplied with electrical power.

The cable 13 fulfills two functions, first mechanically supporting the antenna 14 and subsequently electrically connecting the electronic equipment positioned on board the helicopter 10 to the antenna 14. The electrical connection encompasses the supply of electrical power and the transmission of data to the antenna 14 or originating therefrom. Alternatively, it is possible to produce an autonomous antenna 14 without electrical connection with the carrier, the cable then being solely supporting. The antenna 14 then has its own source of electrical power, e.g. in the form of a battery. Means for transmitting data, e.g. by radio wave, may be implemented.

The sonar 11 comprises a computer 15, e.g. positioned at the base of the winch 12. The computer 15 is configured to generate the data transmitted to the antenna 14 and to process the data from the antenna 14. The computer 15 is in particular configured to carry out sonar beamforming. The computer 15 is connected to the cable 13 via a slip ring placed on the winch 12, for example. The computer 15 is advantageously connected to a screen allowing a sonar image to be viewed. The computer 15 comprises, for example, a memory containing instructions and a processor that is capable of implementing the instructions allowing the sonar beamforming to be calculated.

Figure 2A:
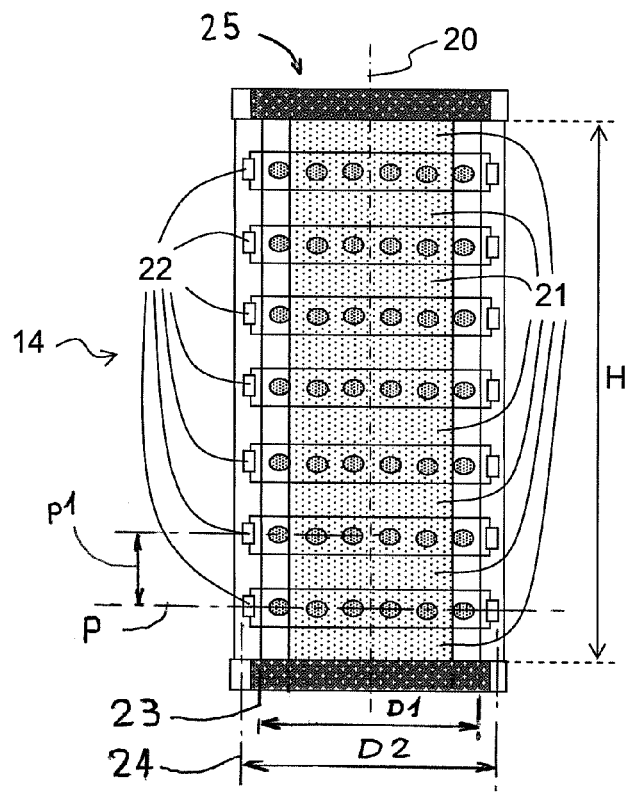
FIGS. 2a, 2b, 2c and 2d show a first embodiment of an antenna belonging to the sonar of FIG. 1.
Figure 2B:
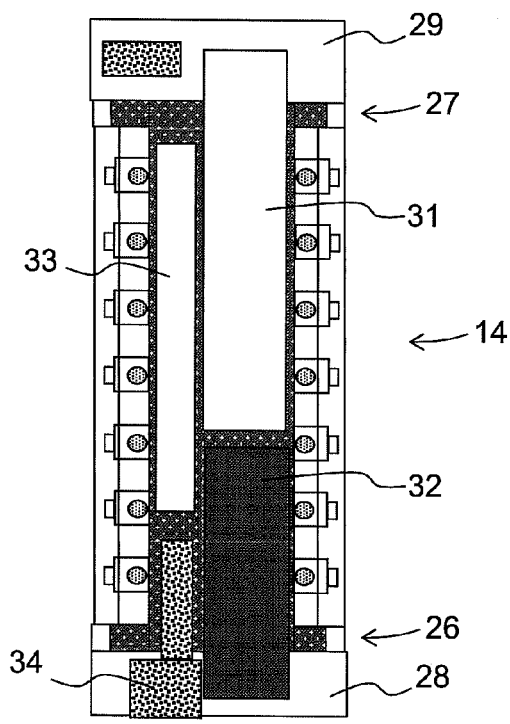
Figure 2C:
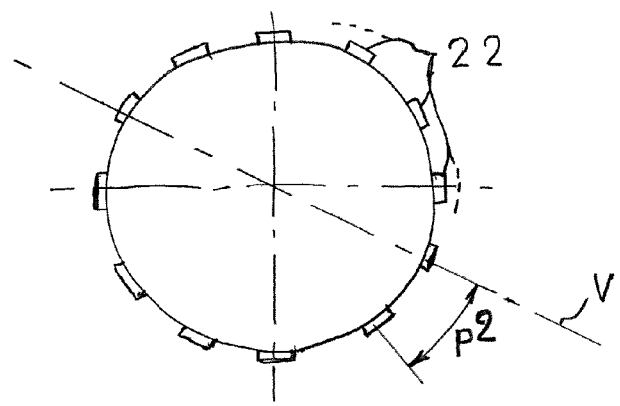
Figure 2D:
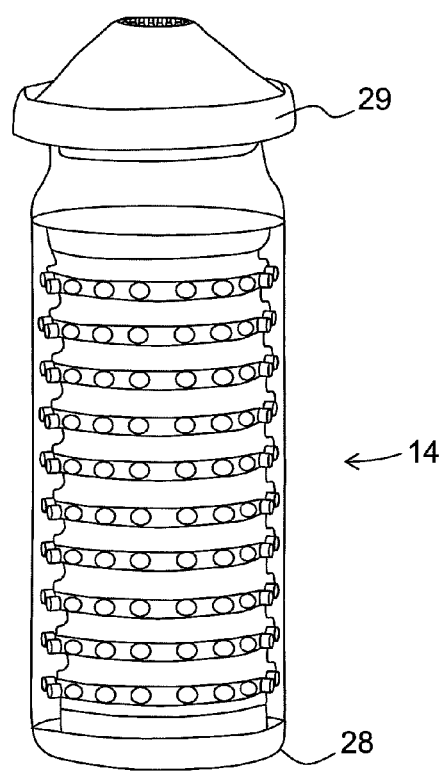

FIGS. 2a, 2b, 2c and 2d show a first embodiment of the antenna 14. FIG. 2a shows a diagrammatic view of the outside of the active portion of the antenna 14. FIGS. 2b and 2c diagrammatically show a cross section of the antenna 14 and FIG. 2d shows a perspective view of the antenna 14.

The antenna 14 is essentially cylindrical. It extends along a longitudinal axis 20. When the antenna 14 is suspended by its own weight by the cable 13, the latter also extends along the longitudinal axis 20.

The active portion of the antenna 14 is formed from sound transmitters and receivers. The transmitters are formed from elementary sound wave transmission rings 21 that are formed around the axis 20 and the receivers are formed from hydrophones 22 that are distributed in rings formed around the axis 20. An exemplary implementation of the elementary transmission rings 21 is, for example, described in the patent EP 0 799 097 B1. The hydrophones 22 are uniformly distributed around the axis 20. The hydrophones 22 are, for example, insulated in a polyurethane-based resin or immersed in an oil bath contained in a flexible envelope.

According to the invention, the elementary transmission rings 21 and the hydrophone rings 22 are distributed along one and the same height H measured along the longitudinal axis 20. This distribution over the entire height H allows the directivity of acoustic reception in terms of elevation to be improved for the hydrophones.

FIG. 2b shows the antenna 14 in cross section in a plane V containing the longitudinal axis 20, referred to as the vertical plane, and FIG. 2c shows the antenna 14 in cross section in a plane P that is perpendicular to the longitudinal axis 20, referred to as the horizontal plane.

A spacing p1 separating two neighboring hydrophones 22 in one and the same vertical plane containing the longitudinal axis 20 may be defined. In the cross-sectional FIG. 2c, a ring of 12 hydrophones 22 that are regularly distributed on the perimeter of the ring appears. The various rings of hydrophones are advantageously identical. A spacing p2 separating two neighboring hydrophones in one and the same ring is defined. The spacing p2 separates the phase centers of each of the hydrophones 22. It is defined by the length of the chord across the perimeter of the ring separating two neighboring hydrophones. The spacings p1 and p2 are advantageously regular. It is nonetheless possible to opt for an irregular distribution of the spacings p1 and p2.

In the example shown in FIGS. 2a, 2b, 2c and 2d, the rings 21 and 22 are alternately arranged. More specifically, the dimensions of the elementary transmission rings 21 and of the hydrophone rings 22 are substantially the same in terms of diameter around the axis 20. The elementary transmission rings 21 and the hydrophone rings 22 are alternatively stacked on top of one another.

The smallest cylindrical volume on axis 20, referred to as the minimum volume, occupied by the elementary transmission rings 21 bears the reference 23. Its diameter around the axis 20 is denoted by D1. The smallest cylindrical volume on axis 20, referred to as the minimum volume, occupied by the hydrophones 22 bears the reference 24. Its diameter around the axis 20 is denoted by D2. The diameters D1 and D2 have a ratio of less than 30%. Stated otherwise, the difference in absolute value between the two diameters D1 and D2 remains less than 30% of the smallest of the two diameters D1 and D2. In the example shown, the diameter D1 is smaller than the diameter D2. We therefore have:

$$(D2-D1)/D1<30\%$$

Advantageously, in order to improve the hydrodynamics of the antenna, this ratio may be less than 20%, or even 10% and ideally less than 5%.

The diameter ratio of the two volumes 23 and 24 is constant regardless of whether the antenna is in operation or in a storage position. Stated otherwise, the antenna comprises no folding arms as in the prior art known for this type of antenna operating at low frequency.

Advantageously, the elementary transmission rings 21 and the hydrophone rings 22 form a tube 25 that extends along the longitudinal axis 20 between two ends 26 and 27. The tube has the largest diameter, D1 or D2 (D2 in the example shown) and is limited by the height H. The antenna 14 comprises two structures 28 and 29 that close the tube 25, each at one of the ends 26 and 27 of the tube 25. The interior of the tube 25 is thus isolated from the environment into which the antenna 14 is dipped. In order to ensure good watertightness of the outer surface of the tube 25 and also to ensure the mechanical protection of the elementary transmission rings 21 and hydrophone rings 22, the cylindrical outer surface of the tube 25 may be covered with an elastomer material such as, for example, a polyurethane-based material. The two structures 28 and 29 may be one-piece metal parts made, for example, of molded aluminum alloy. The upper structure 29 may comprise vertical fins allowing the hydrodynamics of the antenna 14 to be improved while moving through water, in particular during descent and ascent when the winch 12 is in action.

When the inside of the elementary transmission rings 21 is isolated from the environment into which the antenna 14 is dipped, the transmission rings 21 operate according to a technique in which air is located on the inside of the rings 21. This technique is known in the literature by the term "air-backed ring" or ABR.

When the tube 25 is closed at both of its ends, it forms a watertight enclosure inside which electronic equipment may be positioned. By way of example, the antenna 14 comprises an electronic transmitter 31 connected to the elementary transmission rings 21 and an electronic receiver 32 connected to the hydrophones 22. The transmitter 31 and the receiver 32 are positioned inside the tube 25. Other components may be positioned inside the tube 25, such as, for example, a battery 33. Environmental sensors 34 may also be placed inside the tube 25.

Figure 3:
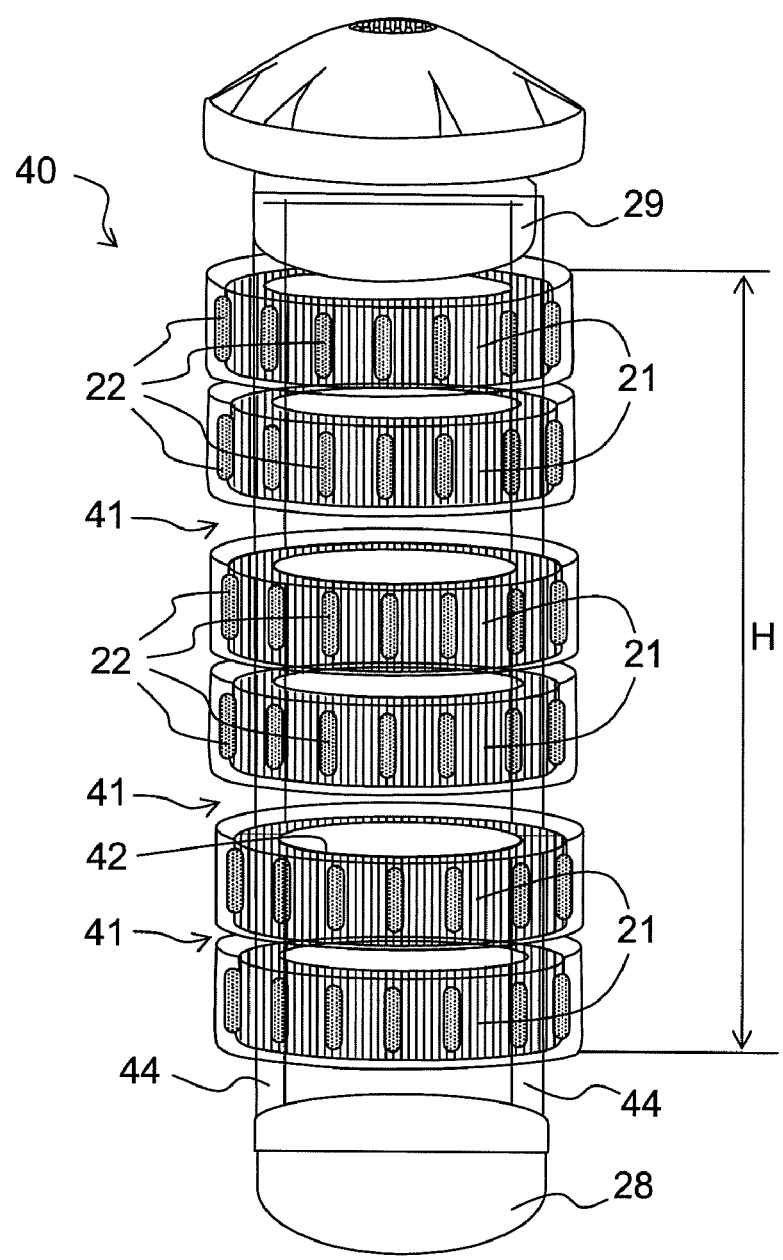
FIG. 3 shows a second embodiment of an antenna belonging to the sonar of FIG. 1.

FIG. 3 shows a second embodiment of an antenna 40 according to the invention. In this embodiment, the hydrophones 22 are concentrically arranged on each of the elementary transmission rings 21. An elementary transmission ring 21 is located inside a ring of hydrophones 22. The elementary transmission rings 21 and the hydrophone rings 22 are, as in the first embodiment, distributed along the height H.

It is possible to position the elementary transmission rings 21 so that they are in contact with one another. The elementary transmission rings 21 then occupy the entire height H. The same applies for the hydrophone rings 22. An antenna 40 that is very compact in terms of height is thus obtained. In this arrangement, the tube 25 may, as above, be watertight and the interior of the tube 25 may be used for positioning electronic equipment therein. The elementary transmission rings 21 then operate according to the ABR technique.

Alternatively, in this second embodiment, inner walls of the elementary transmission rings 21 are in contact with a fluid in the liquid state. This liquid may be enclosed inside the tube 25. The presence of liquid allows the acoustic performance of the antenna to be improved. In order to benefit from the advantages of the presence of a liquid without increasing the mass of the antenna, it is possible to allow the water into which the antenna 14 is dipped to come into contact with the inner walls of the elementary transmission rings 21. To this end, the antenna 40 comprises openings 41 that are arranged between the elementary transmission rings 21. These openings allow the water into which the antenna 40 is dipped to flow along inner walls 42 of the elementary transmission rings 21. Thus, when the antenna 14 is not submerged, the water bathing the interior of the antenna disappears and does not increase the mass of the antenna. When the inside of the elementary transmission rings 21 is bathed in the environment into which the antenna 40 is dipped, the transmission rings 21 operate according to a technique in which water flows freely around the transmission ring 21. This technique is known in the literature by the term "free-flooded ring" or FFR.

In order to allow the presence of the openings 41, the antenna 40 comprises multiple supports 44 linking the two structures 28 and 29. The transmission rings 21 are fixed to the supports 44.

In FIG. 3, the openings 41 are radial. It is also possible to make these openings in the structures 28 and 29.

By implementing the FFR technique, the internal space of the transmission rings 21 is no longer available for positioning electronic equipment therein, which may be placed in watertight compartments made in the structures 28 and 29.

The FFR technique may be implemented in the first embodiment shown with the aid of FIGS. 2a, 2b and 2c by providing one or more openings allowing the interior of the tube 25 to communicate with the exterior.

Figure 4:
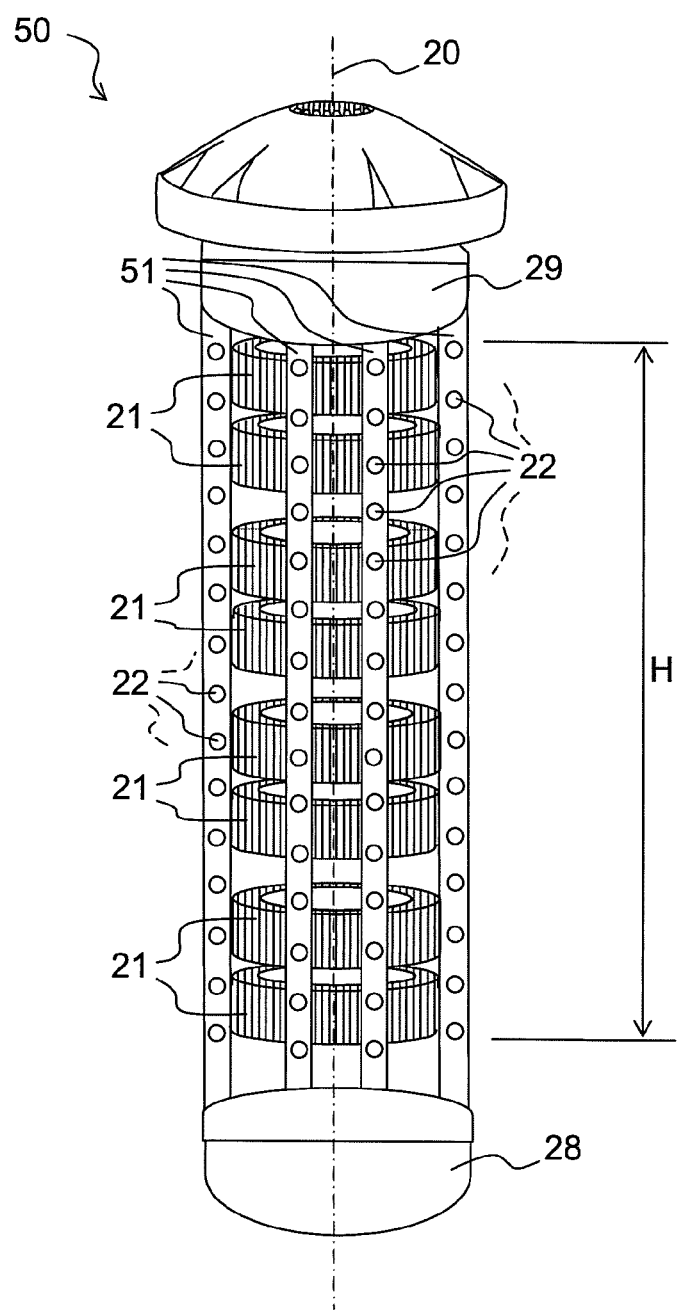
FIG. 4 shows a third embodiment of an antenna belonging to the sonar of FIG. 1.

FIG. 4 shows a third embodiment of an antenna 50 according to the invention. The transmission rings 21 and the two structures 28 and 29 are shown again.

In this embodiment, the hydrophones 22 are not arranged in rings, but on bars 51 that are fixed to the transmission rings 21. The bars 51 may be parallel to the longitudinal axis 20. In this embodiment, it is possible to keep the supports 44 separate from the bars 51. Alternatively, the bars 51 may be used to connect the two structures 28 and 29 and replace the supports 44. The bars 51 may be positioned inside or outside the transmission rings 21.

In the various embodiments and in particular those implementing the FFR technique, it is possible to streamline the antenna in order to improve its hydrodynamic behavior.

The abandonment of the deployable antenna principle leads to a reduction in the diameter of the antenna 14, and hence an enlargement of the main lobe in the directivity diagram of the beam formed by adding up the signals from the hydrophones 22 after compensating for propagation delays for a signal incoming in the setpoint direction. At 4 kHz, the width of this diagram at −3 dB in a horizontal plane that is perpendicular to the axis 20 thus goes from 22° to 52° when switching from a cylindrical antenna with a diameter of 700 mm composed of 12 deployable arms to a compact antenna with a fixed cylindrical geometry and a diameter of 300 mm and composed of 12 columns, such as described in the present invention. Such a decrease in resolution in terms of bearing poses a problem, as it not only translates into a lower signal-to-noise ratio at the beamforming output, about −3 dB in terms of isotropic noise if the deployable arms of the antenna and the columns of the compact antenna are each composed of four hydrophones spaced apart by 160 mm along the vertical axis 20, but also into a loss of precision in the angular location of a nearby target by a factor of three.

In the invention, use is made of the fact that the horizontal spacing in a sub-array is much smaller than the half-wavelength, and that as a consequence the ambient noise at two neighboring hydrophones is strongly correlated, to carry out beamforming that maximizes the signal-to-noise ratio, such beamforming being different from prior conventional beamforming that maximizes the signal-to-noise ratio when the noise is spatially decorrelated. The complex coefficients for baseband beamforming may be calculated from the noise covariance matrix according to the well-known processing formalism for adaptive antennas. According to the prior art, the covariance matrix may either be calculated from the assumed angular distribution of ambient noise, or estimated on the basis of signals from the antenna. With respect to the conventional processing, which is the specific case of this processing for a noise covariance matrix that is equal to the product of the identity matrix and of the power of the noise at the output of a hydrophone, the gain in signal-to-noise ratio for isotropic noise, i.e. directive gain, is increased by 5 dB and the opening at −3 dB in the directivity diagram in the horizontal plane is reduced to 23°, thereby bringing the directive gain of the compact antenna to 2 dB above that of the deployable antenna. The same adaptive processing on the deployable antenna only leads to a gain of barely more than 1 dB due to the low spatial correlation of the noise on this antenna, for which the spacing between hydrophones is close to the half-wavelength.

In the prior art for sonar, groups of a small number of hydrophones have a spacing that is smaller than the half-wavelength and their signals are combined by means of cardioid-type beamforming whose directivity diagram has zeros in predetermined directions. An antenna may be composed of multiple groups of this type, the value of the spacing between groups being close to the half-wavelength at the highest frequency in the band of the sonar. In the invention, the horizontal spacing p2 between two neighboring hydrophones is advantageously less than one third of the wavelength $\lambda/3$, it is about $\lambda/5$ in the example above, as is the spacing p1 between neighboring hydrophones of one and the same vertical column. To measure the spacing between hydrophones, the projections from the phase centers of the respective hydrophones is considered. The wavelength may vary depending on numerous parameters, such as water temperature and pressure. For the geometric definition of the spacing between hydrophones, the speed c of a sound wave in water is taken to be 1500 m/s. The wavelength $\lambda$ is given by the formula $\lambda=c/f$. For an antenna of circular cross section, the horizontal spacing between two hydrophones is the length of the chord between two neighboring hydrophones over the diameter in question. For a working frequency of 4 kHz, the wavelength is 0.375 m. For this working frequency, the horizontal spacing between two neighboring hydrophones is therefore advantageously less than $\lambda/3$, i.e.: 0.125 m. For a compact antenna with a diameter of 300 mm working at 4 kHz and having 12 hydrophones 22 in each horizontal plane, a spacing of the order of 0.08 m is obtained, i.e. of the order of $\lambda/5$.

If the columns of the compact antenna in our example are composed of seven hydrophones with a spacing of 80 mm instead of four hydrophones with a spacing of 160 mm as first assumed, with the height between the two end hydrophones of a column remaining equal to 480 mm, the gain, with respect to the conventional processing, of the processing that is optimized with respect to the spatial correlation of an isotropic ambient noise becomes higher than 6 dB.

The directivity gain due to narrowing the spacing between hydrophones and taking the spatial correlation of the isotropic noise into account in the calculation of the beamforming coefficients is particularly sensitive to antenna calibration errors. Beamforming with coefficients that are calculated according to the same formalism as that which is optimum for a perfectly calibrated antenna then gives performance that may be lower than that of the conventional processing, for which reason this type of antenna has not been employed until now. In the invention, this sensitivity may be remedied by means of a coefficient calculation that aims to attenuate the negative effect thereof according to a processing formalism referred to as an "adaptive robust" formalism, which remains based on the noise covariance matrix but takes the uncertainty in the antenna's response in the direction of the beam into account. There exist multiple coefficient calculation variants. The processing described in the article "On Robust Capon Beamforming and Diagonal Loading" by Jian LEE, published on Jul. 7, 2003 (IEEE Transactions on signal processing, Vol. 51 No. 7) may, for example, be used. With respect to the ideal case in which antenna calibration is perfect and for realistic calibration errors, for example with a standard deviation of 1 dB in terms of gain and 10° in terms of phase, in the preceding example we lose the advantage in directive gain of the compact antenna with a diameter of 300 mm composed of 12 columns of seven hydrophones over the deployable antenna with a diameter of 700 mm composed of 12 arms each bearing four hydrophones, both antennas then having almost equivalent directive gains.

The invention claimed is:

1. An omnidirectional antenna intended to be equipped by a dipping sonar, the antenna comprising multiple elementary transmission rings that are formed around a longitudinal axis of the antenna and multiple hydrophones that are distributed around the longitudinal axis, the antenna being intended to be dipped in water, the hydrophones being separate from the elementary transmission rings, the hydrophones and the elementary transmission rings being fixed to one another in the antenna, wherein the elementary transmission rings and the hydrophones are interlinked along one and the same height measured along the longitudinal axis, wherein the elementary transmission rings and the hydrophones operate at a working frequency of less than 8 kHz, wherein a first minimum cylindrical volume around the longitudinal axis occupied by the elementary transmission rings has a diameter D1, a second minimum cylindrical volume around the longitudinal axis occupied by the hydrophones has a diameter D2 and the difference in absolute value between the two diameters D1 and D2 remains less than 30%, of the smallest of the two diameters D1 and D2, wherein the diameter ratio of the two volumes is constant regardless of whether the antenna is in operation or in a storage position and wherein the projections from the phase centers of the hydrophones in a horizontal plane (P) that is perpendicular to the longitudinal axis, or in a vertical plane (V) containing the longitudinal axis, are spaced apart by a spacing of less than $\lambda/3$, $\lambda$ being the wavelength at the working frequency, the hydrophones being distributed in rings formed around the longitudinal axis in the horizontal plane (P), the spacing (p2), referred to as the horizontal spacing, between two hydrophones is the length of the chord between two neighboring hydrophones over the diameter in question.

2. The antenna as claimed in claim 1, wherein the hydrophones are arranged on bars that are fixed to the transmission rings.

3. The antenna as claimed in claim 1, wherein the hydrophones are distributed in rings that are formed around the longitudinal axis.

4. The antenna as claimed in claim 3, wherein the elementary transmission rings and the hydrophone rings are arranged alternately along the height.

5. The antenna as claimed in claim 1, wherein the hydrophones are superposed over the elementary transmission rings.

6. The antenna as claimed in claim 3, wherein the elementary transmission rings and the hydrophone rings form a tube that extends along the longitudinal axis between two ends, wherein the antenna comprises two structures that close the tube, each at one of the ends of the tube.

7. The antenna as claimed in claim 1, wherein the inner walls of the elementary transmission rings are in contact with a fluid in the liquid state.

8. The antenna as claimed in claim 7, comprising openings that allow the water into which the antenna is dipped to flow along inner walls of the elementary transmission rings.

9. The antenna as claimed in claim 8, wherein the openings are arranged between the transmission rings.

10. A dipping sonar comprising a cable and an antenna as claimed in claim 1, the antenna being suspended from the cable.

11. The dipping sonar as claimed in claim 10, further comprising a winch that allows the cable to be wound in and wound out.

12. The dipping sonar comprising a computer and an antenna as claimed in claim 1, the computer being configured to carry out sonar beamforming, beamforming parameters being calculated on the basis of the covariance of a spatially correlated noise according to an adaptive processing formalism that is robust with respect to antenna calibration errors.

* * * * *